June 29, 1937.  A. J. JOHNSTON  2,085,589
TELEMETERING APPARATUS
Filed Feb. 18, 1936
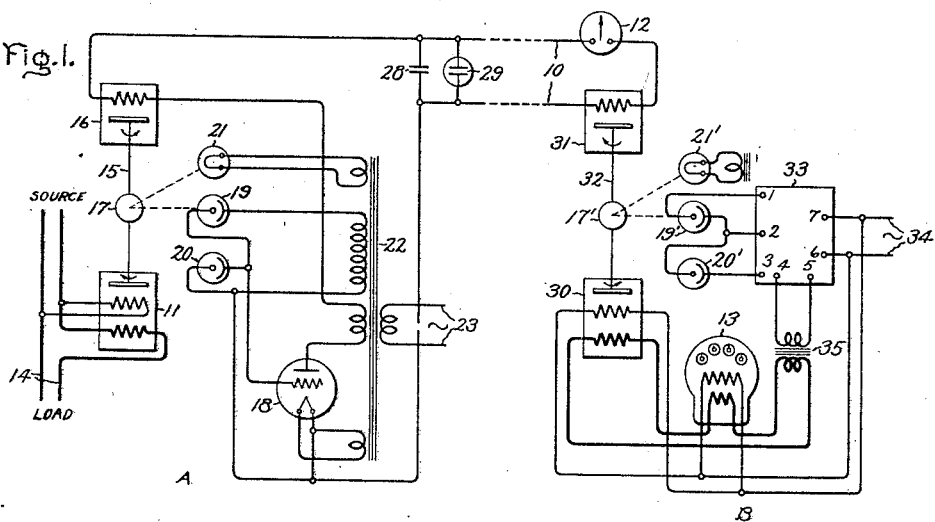
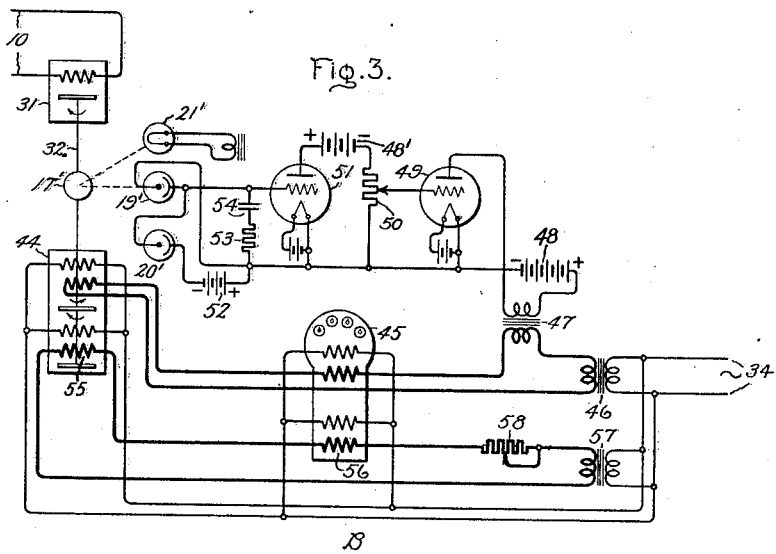
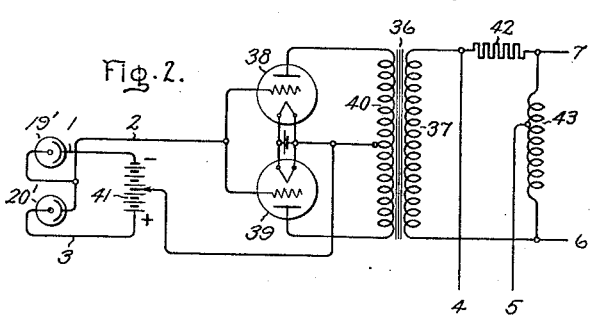
Inventor:
Arthur J. Johnston,
by Harry E. Dunham
His Attorney.

Patented June 29, 1937

2,085,589

UNITED STATES PATENT OFFICE 2,085,589

TELEMETERING APPARATUS

Arthur J. Johnston, Aldan, Pa., assignor to General Electric Company, a corporation of New York Application February 18, 1936, Serial No. 64,477

5 Claims. (Cl. 177—351)

My invention relates to telemetering apparatus and in particular to a telemetering receiver so arranged as to produce an integration of a measurement made at a distant point. For example, I may transmit signals representative of a wattmeter measurement and I provide receiving apparatus for not only reproducing the wattmeter measurement but also for producing a watt-hour meter reading corresponding thereto.

The features of my invention which are believed to be novel and patentable will be pointed out in the claims appended hereto. For a better understanding of my invention, reference is made in the following description to the accompanying drawing wherein, in Fig. 1, I have represented the essential elements of a complete telemetering system embodying my invention. Fig. 2 represents one form of vacuum tube amplifier circuit that may be used in the receiving apparatus of Fig. 1 and Fig. 3 represents alternative receiving apparatus that may be used in place of the receiving apparatus shown in Fig. 1.

Referring now to the drawing for a more detailed description of the apparatus employed in carrying out my invention, I have represented at A apparatus for transmitting a current over an electric circuit 10 to receiving apparatus located at a distant point B. The stations A and B may be in the same station or many miles apart, and the illustrated embodiment of the invention is for the purpose of reproducing a measurement corresponding to that of a wattmeter element 11 at station A on an instrument 12 at station B and also the corresponding watt-hour meter measurement on a watt-hour meter 13 at station B.

At station A, the wattmeter element 11 is connected to produce a torque corresponding to the instantaneous value of power flowing in a power circuit 14. The device 11 may be similar in construction to the electrical element of an ordinary wattmeter. Either a single phase or polyphase wattmeter element may be used, depending on the nature of the circuit 14. The wattmeter element 11 has a rotatable shaft 15 extending to a restraining instrument 16 and on the same shaft is a mirror 17. The instrument 16 may be similar in construction to the electrical element of an ordinary direct current ammeter.

The instruments 11 and 16 differ from the ordinary wattmeter and ammeter in that they have no scale or pointer and the torque produced is not restrained by a spring or any other mechanical torque restraining means such as is used in an ordinary indicating instrument.

The current which flows through the restraining instrument 16, and which is transmitted over the telemetering circuit 10, is supplied from a rectifier comprising a three-electrode vacuum tube 18. The grid bias and output current of tube 18 are controlled by a pair of photoelectric cells 19 and 20 in accordance with the division of light which falls upon these cells from a light source 21 after being reflected from the mirror 17. The energy for supplying the lamp 21, the photoelectric cell circuit, the filament of tube 18, and the output circuit of the tube is obtained from a transformer 22 supplied from an alternating-current source 23.

The direction of current flow through instrument 16 is such that the torque produced thereby is opposed to the torque produced by wattmeter element 11. When the torque of wattmeter element 11 is zero, the mirror 17 is in a position such that the light falls mostly on cell 19, which increases the negative grid bias on tube 18 to a point where it passes no current and no current flows in the restraining instrument 16 or circuit 10. Hence the torque of restraining instrument 16 is zero.

As soon as power flow commences in circuit 14, wattmeter element 11 produces a torque which rotates mirror 17 to reflect less light on cell 19 and more light on cell 20. This correspondingly decreases the negative grid bias of tube 18 and the tube passes current which causes restraining instrument 16 to produce a restraining torque opposing the torque produced by the wattmeter element 11. As there is no mechanical torque restraining means to oppose the torque of wattmeter element 11, the mirror 17 will continue to be rotated until the current through the restraining instrument 16 and circuit 10 is sufficient to just bring about a balance of torques that prevents further rotation of mirror 17. Hence the current in circuit 10 is proportional to the power flowing in circuit 14. A condenser 28 and a voltage protective device 29 are shown connected across the telemetering circuit to smooth out ripples and give over-voltage protection. It has been found that a direct current proportional to the wattmeter measurement of meter 11 can thus be produced for transmission to a distant point with a high degree of accuracy and reliability.

At the receiving station B, the current of telemetering circuit 10 flows through an indicating instrument 12 and a torque-producing instrument 31. The instrument 12 is an ammeter but its scale may be calibrated directly in watts flowing in the power circuit 14 at station A as measured by wattmeter element 11. The torque instrument 31 is the same kind of direct-current instrument as is the torque-producing instrument 16 at the transmitting station. It has a rotatable shaft 32 extending to a restraining instrument 30, which instrument is similar to wattmeter element 11. The torques of instruments 31 and 30 are opposed and any unbalance is caused to rotate a mirror 17' on the common shaft 32. The mirror 17' is part of a photo-electric cell light ray current-controlling system including photocells 19' and 20' and light source 21', similar in structure and operation to that already described at the transmitting station A.

The energy which it is practicable to transmit over the transmitting circuit 10 is not sufficient to operate a meter of the integrating type, and the receiving apparatus includes means for obtaining an amplifying effect of such transmitted energy in the form of alternating current that may be metered by a standard type of alternating-current watt-hour meter.

At station B the receiving apparatus includes an alternating-current vacuum tube amplifier designated by 33, which is supplied through terminals 6 and 7 from an alternating-current source 34 and is controlled through terminals 1, 2 and 3 by the photocells 19' and 20' to produce an output of alternating current at terminals 4 and 5 which varies from zero when the current in transmitting circuit 10 is zero to a maximum when the current in circuit 10 is a maximum. This current is suitably transformed when necessary by a transformer 35 and is fed through the current coils of a standard single-phase watt-hour meter 13 and the single-phase wattmeter element 30.

The watt meter element 30 comprises the restraining instrument which opposes the torque of the receiving instrument 31. The voltage coils of the watt-hour meter 13 and the wattmeter restraining instrument 30 are fed from the alternating-current supply 34 in parallel. The details of the vacuum tube amplifier are not important so long as it is capable of being controlled by the division of light between the photocells 19' and 20' to produce an alternating-current output which varies from zero when the torque of the receiving instrument 31 is zero to a value sufficient to operate the watt-hour meter 13 at the maximum rate required. The accurate and successful operation of the type of torque balance apparatus used both at the transmitting and receiving stations is independent of variations in tube and lamp characteristics, voltage variations in the source of supply thereof, transmission line resistance, etc. The reason for this is that the transmitting and receiving apparatus are of the torque balance type. The torques of instruments 11 and 16 are of necessity maintained equal and opposite except when a change occurs that requires a rebalancing. Likewise, the torques of instruments 31 and 30 are maintained equal and opposite except at the instant of rebalancing. The torque of instrument 31 at the receiving station is maintained strictly proportional to the torque of instrument 16 at the transmitting station since the said instruments are energized in series relation by the same or proportionate currents.

It is quite apparent that the torque of watt-hour meter 13 will be strictly proportional to that of restraining wattmeter 30 since the said meters are similarly energized. The watthour meter 13 in effect integrates the energy supplied to the wattmeter 30. It follows, therefore, that the torque of watt-hour meter 13 will be strictly proportional to that of wattmeter 11 and may be calibrated to give an accurate integrated measurement of the energy consumed in power circuit 14 regardless of changes in the constants of the transmitting circuit apparatus, etc. To make this point clear, let us assume that, with a given current in line 10 and a given value of balanced torques of instruments 30 and 31, the photocell 20' decreases in efficiency such that the torque of instrument 30 is reduced. Immediately, the mirror 17' is turned into a new position where the required torque balance is restored. Again, let us assume that, with a balance condition corresponding to a given energy flow of power circuit 14, the voltage of source 34 increases tending to increase the output of amplifier 33 as well as the voltages and torques of instrument 30 and watt-hour meter 13. Immediately, the torque balance between 30 and 31 is disturbed and the mirror 17' is turned to a new position where the output of amplifier 33 is reduced to a value to restore the torque balance. Thus, instrument 12 produces an accurate indication of the instantaneous watts flowing in power circuit 14, and watt-hour meter 13 produces an accurate integration of the energy consumed in power circuit 14. It will also be evident that, if device 11 is a reactive component instrument or a steam flow instrument, instrument 12 will indicate instantaneous reactive component or steam flow, and meter 13 will integrate reactive component or steam flow, as the case may be.

Fig. 2 represents one possible alternating-current power amplifier that may be used for the device represented at 33 in Fig. 1, and which is controlled by the photoelectric cells 19' and 20'. In this circuit, the alternating-current supply connected at terminals 6 and 7 supplies the primary winding 37 of a transformer 36. Vacuum tubes 38 and 39 are connected across the two halves of the secondary winding 40 such that, when these tubes are made conducting, the secondary winding of the transformer is more or less loaded. The extent of such loading is controlled by the grid bias on the tubes derived from a battery 41 by means of the photoelectric cells 19' and 20'. Thus, when cell 20' receives more light than cell 19', the grid bias of both tubes is positive and the tubes conduct more current supplied from the transformer. When cell 19' receives more light than cell 20', the grid bias on the tubes 38 and 39 is negative, and the tubes conduct less current. Hence the transformer load varies in accordance with the division of light between the cells 19' and 20'.

A resistance 42 is connected in series with the primary winding 37 of the transformer 36, and the supply leads 4 and 5 to the current coils of the watt-hour meter 13 and restraining meter 30 are supplied from the voltage drop across resistance 42. This voltage drop will not be reduced to zero even when the tubes 38 and 39 are passing no current because, even though the secondary winding 30 is open circuited, the transformer will draw some exciting current. To provide means for reducing the current supplied over leads 4 and 5 to zero (corresponding to zero power in circuit 14), a bridge connection is used, the lead 5 being connected to a tap in an autotransformer 43 connected across supply leads 6 and 7 as shown.

In Fig. 3, I have shown another form of torque balance receiving apparatus that may be used in Fig. 1 in place of the station B receiving apparatus there shown. Certain of the parts are similar to those of Fig. 1 and are designated by like reference characters.

In Fig. 3, a restraining wattmeter element 44 and a watt-hour meter 45, both having two torque-producing elements, such as are used in polyphase meters, are employed. The upper torque elements of these two devices have their current coils connected in series with a variable reactor 47 and this circuit is supplied from the alternating-current supply 34 through a suitable transformer 46. The variable reactor 47 is of the saturable core type, the core being more or less saturated by a direct-current winding supplied from a direct-current amplifier circuit controlled through the photoelectric tube arrangement and torque balance mirror shaft 32. The direct-current amplifier circuit is supplied from a storage battery 48 through a control tube 49. The grid bias of tube 49 is in turn controlled by the voltage drop across an adjustable resistor 50 in the plate circuit of a second tube 51, which is supplied from battery 48'. The grid bias and conductivity of tube 51 are controlled by the relative conductivity of the photoelectric cells 19' and 20' as influenced by the light reflected from the light source 21' by the mirror 17'. This grid bias is supplied by a battery 52. A resistor 53 and condenser 54 in series are preferably connected across the grid bias circuit of tube 51, as shown, to produce a stabilizing action and prevent hunting.

The action of this apparatus is to produce a flow of direct current in the reactor 47 approximately proportional to the current received by instrument 31 over the transmitting circuit 10. This, in turn, controls the degree of saturation of the saturable core reactor 47 and allows alternating current to flow to the current coils of the upper torque elements of meters 44 and 45 approximately in proportion to the degree of saturation and corresponding reduction in impedance of device 47. The upper torque elements of meters 44 and 45 are the principal torque-producing elements of these meters and the torque of meter 44 is opposed to that of receiving instrument 31.

Owing to the fact that the impedance of the saturable core reactor 47 cannot reduce the alternating-current therethrough exactly to zero, it is necessary to compensate for the residual torque that will be produced in the upper torque elements of meters 44 and 45 when the torque of instrument 31 is zero, and this is accomplished by the lower torque elements of these meters. The current coils of the lower torque elements of meters 44 and 45 are designated by reference characters 55 and 56 and these coils are supplied in series through a transformer 57. The circuit includes an adjustable impedance 58 to be used in adjusting the current to a suitable value. The potential coils of all of the torque elements of meters 44 and 45 are supplied in parallel from the alternating-current source 34. The torques of the lower elements of meters 44 and 45 are opposed to the torques of the upper torque elements. The torques of these lower elements are made equal to or greater than the residual torque of the upper torque elements when no current is received over transmitting circuit 10, when the torque of instrument 31 is zero, and when no direct current flows in the direct-current winding of the saturable reactor 46. Since all coils of meters 44 and 45 are supplied from the same alternating-current supply 34, a variation in voltage of such source will influence all of the torques of these meters in the same direction and, consequently, it will not be a disturbing factor. The resultant torques of meters 44 and 45 will vary in the same relation. The resultant torque of meter 44 will be equal and opposite to the torque of instrument 31 and strictly proportional to that of the measurement meter 11 (Fig. 1) at the transmitting station.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. A telemetering system comprising electrically-interconnected transmitting and receiving apparatus, the transmitting apparatus comprising a meter for producing a torque proportional to a quantity measured thereby, a direct-current electrical instrument mechanically connected to the first meter for restraining its torque, a direct-current source of supply for said instrument, electrical apparatus responsive to any difference in the torques of said meter and instrument for controlling the current supplied to said instrument so as to maintain said torques balanced and transmitting a direct current to the receiving apparatus proportional to the quantity measured by said meter, the receiving apparatus comprising an electrical measuring instrument connected to respond to the transmitted direct current and to produce a torque proportional thereto, a wattmeter mechanically connected to said receiving instrument to oppose its torque, a source of supply for said wattmeter, electrical apparatus responsive to any difference in the torques of said receiving instrument and wattmeter for controlling the energy supplied to said wattmeter so as to maintain its torque equal to that of the receiving instrument, and a watt-hour meter electrically connected to integrate the energy supplied to said wattmeter and calibrated to produce an integration measurement of the quantity measured by the meter at the transmitting station.

2. A telemetering system comprising electrically-interconnected transmitting and receiving apparatus, said transmitting apparatus including an instrument for measuring a quantity and means controlled thereby for transmitting a direct current to the receiving apparatus which is proportional to such measurement, said receiving apparatus including a direct-current instrument which is responsive to and which produces a torque proportional to the transmitted direct current, a wattmeter and a watt-hour meter, a common source of supply for the wattmeter and watt-hour meter, said wattmeter being mechanically connected to oppose the torque of said direct-current receiving instrument, and means controlled in response to any difference in the torques of said receiving instrument and wattmeter for controlling the electrical energy supplied to said wattmeter and watt-hour meter so as to maintain the torque of said wattmeter equal to the torque of said receiving instrument and proportional to the torque of said watt-hour meter, whereby said watt-hour meter may be calibrated to produce an integrated measurement of the quantity measured at the transmitting station.

3. In a telemetering system of the type in which an electric current is transmitted to receiving apparatus in proportion to a measurement made at a transmitting station, receiving apparatus for such system comprising an electrical measuring instrument adapted to be energized by and to produce a torque proportional to such current, a wattmeter and a watt-hour meter both having current and potential windings, said wattmeter being mechanically connected to oppose the torque of said electrical measuring instrument, a source of supply, connections for supplying the potential windings of said wattmeter and watt-hour meter in parallel from said source, connections for supplying current windings of said wattmeter and watt-hour meter in series from said source, and means responsive to any difference in the torques of said instrument and wattmeter for regulating the amount of current in said series circuit to maintain said torques equal and the wattmeter and watt-hour meter torques proportional.

4. In a telemetering system, torque balance receiving apparatus comprising an electrical measuring instrument so energized as to produce a torque proportional to a measured quantity, a wattmeter mechanically connected to oppose the torque of said instrument, a watt-hour meter, a source of supply and connections including a common energizing circuit for similarly energizing said wattmeter and watt-hour meter from said source, and means controlled in response to any difference in the torques of said receiving instrument and wattmeter to vary the energization of said wattmeter and watt-hour meter in a direction to restore the torque balance between the receiving instrument and wattmeter whenever their torques become unbalanced.

5. In a telemetering system, a torque balance receiving apparatus comprising an instrument so energized as to produce a torque proportional to a measured quantity, a wattmeter mechanically connected to oppose the torque of said instrument, a watt-hour meter, an alternating-current source of supply, connections including a common energizing circuit for similarly energizing said wattmeter and watt-hour meter from said source, a variable impedance of the saturable core type in said common energizing circuit, a direct-current circuit including a source of supply, a winding on said saturable core impedance, and means responsive to any difference in the torques of said instrument and wattmeter for controlling the amount of direct current in and the degree of saturation of said variable impedance to thereby control the alternating current supplied therethrough to said wattmeter and watt-hour meter, in a manner to reduce any such torque unbalance, and means for supplying said wattmeter and watt-hour meter with supplemental torques equal and opposite to their torques incident to the current transmitted through said variable impedance device when no direct current is supplied thereto and the value of said impedance is a maximum.

ARTHUR J. JOHNSTON.